United States Patent [19]

Matsuoka et al.

[11] Patent Number: 4,807,445
[45] Date of Patent: Feb. 28, 1989

[54] REFRIGERATION SYSTEM

[75] Inventors: Akio Matsuoka, Oobu; Yuuji Honda; Masasi Takagi, both of Kariya, all of Japan

[73] Assignee: Nippondenso Co., Ltd., Kariya, Japan

[21] Appl. No.: 124,865

[22] Filed: Nov. 24, 1987

[30] Foreign Application Priority Data

Nov. 25, 1986 [JP] Japan .................. 61-280343

[51] Int. Cl.$^4$ .............................. F25B 41/00
[52] U.S. Cl. ........................ 62/212; 62/225
[58] Field of Search ............ 62/212, 225; 236/78 D; 364/157, 162; 318/619

[56] References Cited

U.S. PATENT DOCUMENTS 2,743,403 4/1956 Wernlund ............... 318/619
4,617,804 10/1986 Fukushima et al. ........... 62/212

FOREIGN PATENT DOCUMENTS 0092835 7/1980 Japan .................. 236/78 D
60-146267 9/1985 Japan .
62-155473 7/1987 Japan .

Primary Examiner—William E. Wayner
Attorney, Agent, or Firm—Cushman, Darby & Cushman

[57] ABSTRACT

The degree of opening of the expansion valve in refrigeration system is controlled by means of PID control such that a refrigerant superheat at the outlet of the evaporator approaches a target valve. Since an elapsed time after the start of the refrigeration system varies in response to a change of a heat load of air to be cooled by the evaporator, if the control constant of the PID control is designed so that the expansion valve can be controlled adequately for high evaporator heat load, or for low evaporator heat load, adequate control cannot be achieved in the opposite case not taken into consideration in design. According to the present invention, the control constant of the PID control is varied when an elapsed time after the start of the refrigeration system reaches a reference time which is determined on the basis of a heat load of air to be cooled by the evaporator.

14 Claims, 7 Drawing Sheets

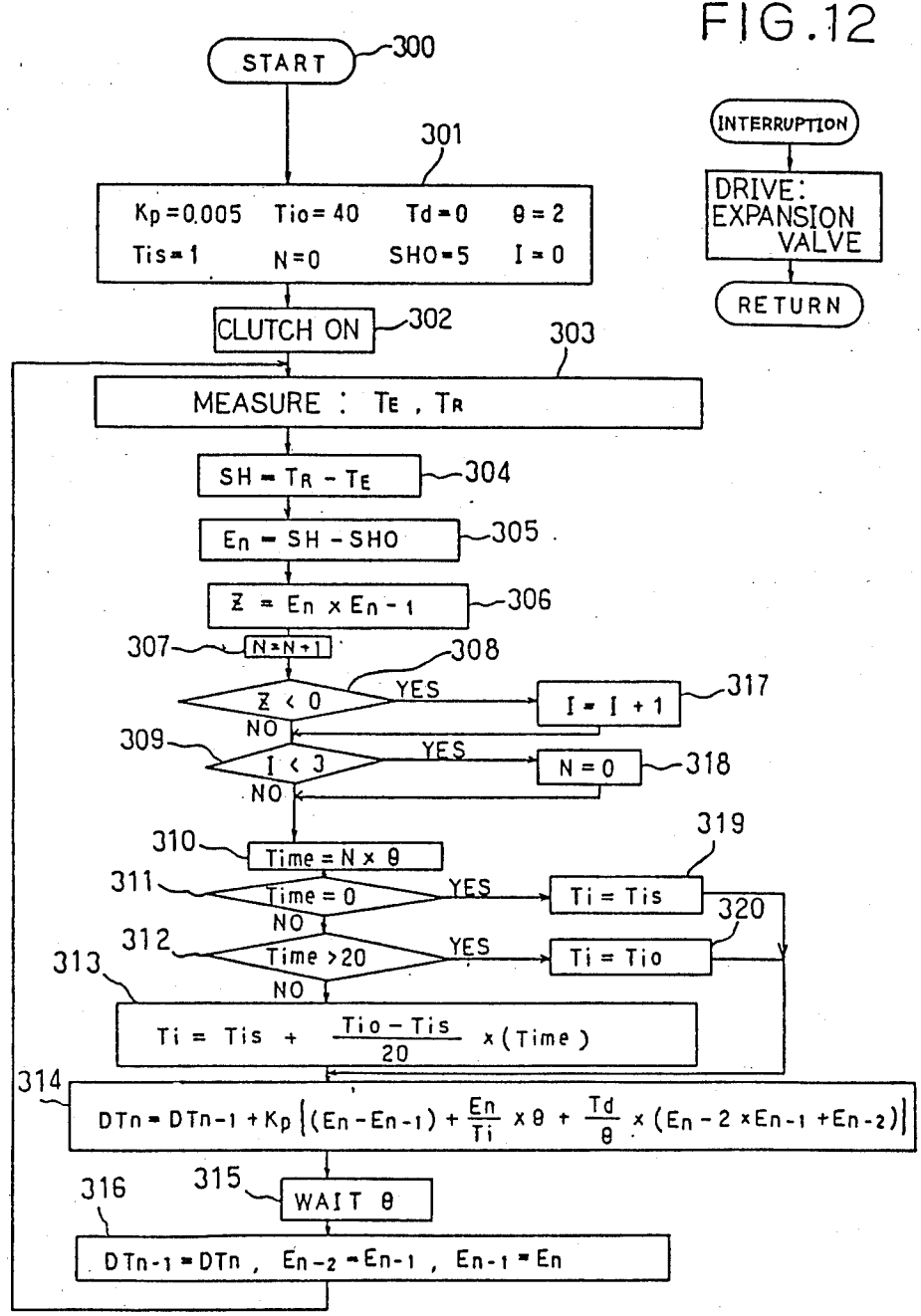

REFRIGERATION SYSTEM

BACKGROUND OF THE INVENTION

1. Field of the Invention

This invention relates generally to refrigeration systems. More specifically, the invention relates to the control of an electricallydriven expansion valve for use in a refrigeration system.

2. Description of the Prior Art

Refrigeration systems include an expansion valve which regulates the flow rate of a refrigerant flowing in the system. It is known to change the degree of opening of the expansion valve in accordance with the heat load of an evaporator of the system such that the degree of superheat (SH) of the refrigerant at the outlet of the evaporator is held constant.

A refrigeration system usually exhibits an unstable transient state immediately after it is started. Therefore, it is very difficult to achieve accurate superheat (SH) control by regulating the degree of opening of the expansion valve.

When accurate superheat (SH) control cannot be achieved, an excessive degree of superheat (SH) may occur due to either too low a refrigerant flow rate, or "liquid back" which is a return of a liquid refrigerant to the compressor due to an excessive flow rate. When the flow rate is either too low or too high, performance and reliability of the system are degraded. The ability of the system to cool is lessened. Power consumption of the compressor increases, and the compressor abnormally overheats.

Japanese Utility Model Laid-Open No. 60-146267 discloses a refrigeration system which uses an electrically-driven expansion valve the degree of opening of which can be electrically controlled. The system determines the deviation, at the outlet of the evaporator of the refrigeration system, between the actual degree of superheat and a desired (objective) degree of superheat and controls the degree of opening of the expansion valve accordingly. Control of the expansion valve is carried out in accordance with a predetermined function of the deviation. This predetermined function includes proportional, integral, and derivative control components (hereinafter abbreviated as PID control). A control constant (control gain) of the PID control is changed after a predetermined elapsed time from the start of the refrigeration system (set time). In other words, it is pre-programmed that after some fixed specified time, the gain of the PID control circuit will be changed from a start value to a steady state operation value.

The actual operating condition of the refrigeration system changes largely due to a variation of the rotating speed of the system's compressor. In particular, in the case of an automobile air conditioner, the rotating speed of the compressor varies over a wide range of rotational speeds because it is driven by an engine. The actual operating condition is also affected by the amount of heat load, etc. Therefore, the time interval from the start of the refrigeration system to the moment the objective degree of superheat is reached varies largely depending on the operating condition. Consider a system which is started (initially turned on) when the expansion valve is set to a predetermined degree of opening, for example, it is fully opened. For a high heat load, the expansion valve can reach its adequate degree of opening within a short time from the start from start up of the system because the desired degree of opening is close to full-open. In contrast, for a low heat load, the desired degree of opening of the expansion valve is small. The degree of opening must be decreased from the initial full-open state down to a nearly-closed state. Therefore, the time interval required for the expansion valve to reached the desired degree of opening is long in comparison with the case of a high heat load.

If the PID control constant is changed from a first value which is suitable for a period immediately after the start to a second value that is suitable for steady state operation after only a short time (which can be suitable in a high heat load), this change of value of the PID control constant is not suitable for low heat load operation because the degree of opening has not been sufficiently decreased before this change. This makes the time required for reaching an adequately-controlled superheat state longer than it should be.

If the time interval from system start to when the time constant change of the PID control circuit is long (which can be an appropriate choice for low load steady state operation even though the correct degree of opening can be reached within a short time), this time interval would not be suitable for a high-load state condition. The system would tend to "hunt".

Since the above-described known refrigeration system varies the PID control constant after a predetermined elapsed time after the start of the system, if the system is designed so that the expansion valve can be controlled adequately for one case (high evaporator heat load), or for the other case (low evaporator heat load), adequate control cannot be achieved in the opposite case not taken into consideration in design. The system can be designed only for one of the two cases.

SUMMARY OF THE INVENTION

It is an object of the present invention to provide a refrigeration system capable of adequately controlling an electrically-driven expansion valve immediately after a start of the refrigeration system for all load conditions from high to low.

The invention provides a refrigeration system including an expansion valve for decompressing and expanding a refrigerant circulating in a refrigeration system. It utilizes following control scheme.

The degree of opening of the expansion valve is controlled by a proportional plus integral plus derivative (PID) control such that the degree of refrigerant superheat at the outlet of the evaporator approaches a desired (objective) value. Elapsed time after the start of the refrigeration system is monitored. When the elapsed time reaches a reference time, a control constant (in one embodiment this control constant is the gain of the control circuit) of the PID control is changed from a first value to a second value. However, unlike in the prior art, the elapsed time before a change of control constant is not fixed. Rather, according to the present invention, the elapsed time is a function of heat load.

According to one embodiment of the invention, the actual degree of superheat alternately overshoots and undershoots a desired degree of superheat as it approaches the desired degree of superheat. The time interval from the starting of the refrigeration system to the moment at which the actual superheat has "crossed" the desired (objective) superheat a predetermined number of times determines the elapsed time from the starting of the refrigeration system until the control constant is changed. The time it takes for the predetermined number of "crossings" to occur is known as a reference time. In another embodiment of the invention, the time interval used extends from the start of the refrigeration system to the moment at which the actual superheat has altered its direction from the increasing direction to the decreasing direction (or from the decreasing direction to the increasing direction) a predetermined number of times as the actual degree of superheat approaches a desired degree of superheat.

In accordance with the present invention, the PID control constant can be changed at the appropriate time after starting the refrigeration system as a function of the heat load of air to be cooled and the degree of opening of the electrically-driven expansion valve can be controlled well in a transient period after the start of the refrigeration system for both a high-load state and a low-load state, whereby the actual degree of refrigerant superheat can be rapidly converged to the desired (objective) degree of superheat.

BRIEF DESCRIPTION OF THE DRAWINGS

FIGS. 11 and 12 are flowcharts showing in greater detail the control process of the first embodiment of the present invention.

DETAILED DESCRIPTION OF THE PREFERRED EMBODIMENTS

Figure 1:
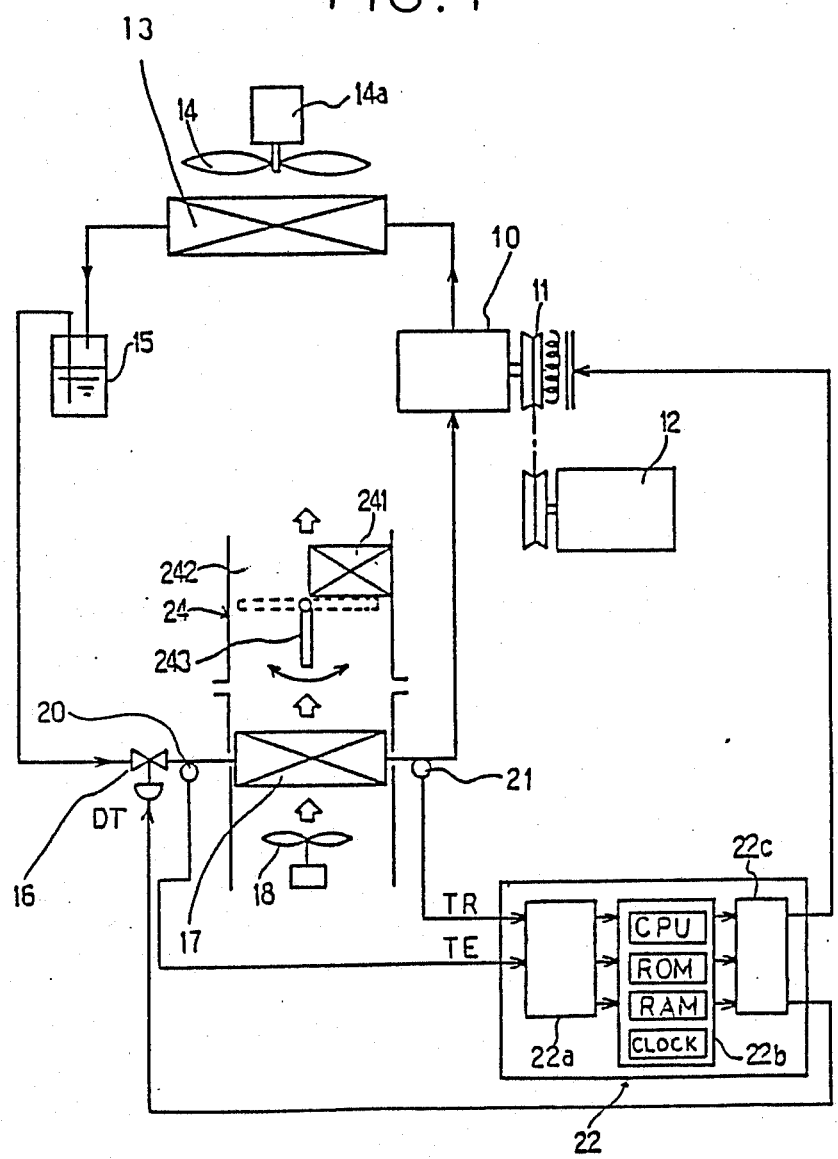
FIG. 1 is a block diagram of a refrigeration system having an electric control system according to the present invention.

FIG. 1 is a block diagram of a refrigeration system with an electric control system. It shows the overall structure of an automobile air conditioning refrigeration system embodying the present invention. A compressor 10 is driven by an automobile engine 12 via an electromagnetic clutch 11. Compressor 10 delivers refrigerant to a condenser 13 which cools the refrigerant by means of cooling air supplied by a cooling fan 14 so that the gas refrigerant is condensed. The cooling fan 14 is driven by a motor 14a. A receiver 15 collects condensed refrigerant from condenser 13.

An electrically-driven expansion valve 16 is connected downstream of receiver 15. The degree of opening of expansion valve 16 is electrically controlled. Liquid refrigerant from receiver 15 is subjected to decompression expansion passing through valve 16. Downstream of electrically-driven expansion valve 16 is connected an evaporator 17, which causes heat transfer to the gas/liquid, two phase refrigerant which has passed through expansion valve 16 from room air or outside air supplied by a blowing fan 18 to vaporize the liquid refrigerant. Cold air, cooled by means of the latent heat of vaporization of the refrigerant, blows into a room after passing through a heater unit 24. As is known in the art, the heater unit 24 includes a heater core 241 whose heat source is an engine cooling water, a temperature control damper 243 for controlling the ratio of air quantity between hot air which results from being heated as passing through the heater core 241 and cold air which passes through a bypass passage 242 of the heater core 241 to regulate the temperature of the air blowing into the room, and the like. The downstream side of the evaporator 17 is connected to the suction side of the compressor 10.

A first refrigerant temperature sensor 20, which is preferably a thermistor, is disposed in an inlet piping section of the evaporator 17 for detecting an inlet-side refrigerant temperature $T^E$. A second refrigerant temperature sensor 21, which is preferably a thermistor, is disposed in an outlet piping section of evaporator 17 for detecting an outlet-side refrigerant temperature $T^R$ of the evaporator. First and second refrigerant temperature sensors 20 and 21, may be configured in either of two modes. In a first mode the sensors are disposed inside a refrigerant pipe line to directly detect the refrigerant temperature, and in a second mode the sensors are tightly secured to the surface of the refrigerant pipe line and sensor attaching sections are covered with heat insulating material to detect the pipe line surface temperature. The first mode is superior in terms of measurement accuracy.

A control circuit 22, includes an input circuit 22a to which the detection signals of the sensors 20 and 21 are applied, a microcomputer 22b for performing a predetermined process on the basis of input signals provided by input circuit 22a, and an output circuit 22c for controlling energization of the electromagnetic clutch 11 and the electrically-driven expansion valve 16 on the basis of the output signals from microcomputer 22b.

The input circuit 22a contains an A-D converter for converting an analog signal to a digital signal, and the like, while the output circuit 22c contains a relay circuit for driving loads, and the like. The microcomputer 22b is a digital computer preferably fabricated from a single LSI chip, this microcomputer 22b being put in an operation ready state upon the application thereto of a constant voltage from a constant-voltage circuit (not shown). Incidentally, the constant-voltage circuit receives a DC voltage from a car-mounted DC power source (a battery) in response to closing of an ignition switch (not shown) for the automobile engine 12 to produce a constant voltage. The microcomputer 22b includes a central processing unit, a Read Only Memory ROM, a Random Access Memory RAM, a clock circuit, etc. The CPU, ROM, RAM, and clock circuits are mutually connected via a bus-line. A first memory (RAM) of the microcomputer 22b receives and temporarily stores digital signals from the input circuit 22a and selectively applies these signals to the CPU. The clock circuit of the microcomputer 22b generates a clock signal having a predetermined frequency in cooperation with a quartz oscillator. On the basis of this clock signal the microcomputer 22b executes control programs previously stored in the ROM of microcomputer 22b.

Figure 10:
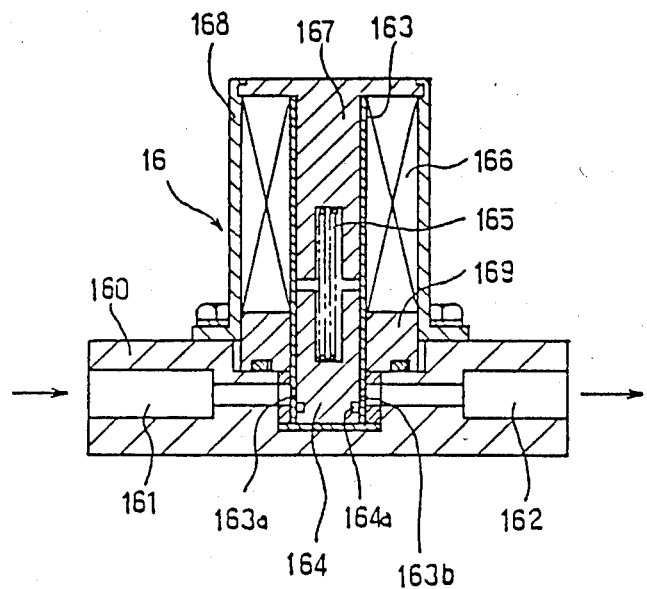
FIG. 10 is a sectional view showing in greater detail the structure of electrically-driven expansion valve shown in FIG. 1.

FIG. 10 (PRIOR ART) shows the structure of the electrically-driven expansion valve 16. A base member 160 has a refrigerant inlet passage 161 on one side and a refrigerant outlet passage 162 on the other side. A cylindrical member 163 made of non-magnetic material has two valve holes 163a and 163b opened at symmetrical positions for subjecting the refrigerant to decompression expansion. A plunger 164 made of magnetic material is slidably inserted in the inner bore of the cylindrical member 163 which When an exciting coil 166 is in a non-energized state is pushed by a coil spring 165 to take a low-end position to thereby completely close the two valve holes 163a and 163b by its peripheral cylinder surface.

A stationary magnetic pole member 167 is disposed opposite to the plunger 164 and secured to the upper end of a cylindrical yoke 168. A magnetic end plate 169 constitutes the magnetic circuit of the exciting coil 166 in conjunction with the members 164, 167 and 168. When the exciting coil 166 is energized, a magnetic attraction force is produced between the plunger 164 and the stationary magnetic pole member 167, so that the plunger 164 is attracted to the stationary magnetic pole member 167 in opposition to the spring force of the coil spring 165, thus, the valve holes 163a and 163b are opened by means of a peripheral ring-like groove 164a of the plunger 164. Accordingly, as a pulse-waveform voltage is applied across the exciting coil 166, the plunger 164 continuously reciprocates to continuously repeat opening and closing of the valve holes 163a and 163b. If the duty ratio (the on-off ratio in a certain period) of the pulse-waveform input voltage applied to the exciting coil 166 is varied, the open-close ratio of the valve holes 163a and 163b is varied, whereby the flow rate of the refrigerant can be regulated. That is, by varying the duty ratio of the input voltage to the exciting coil 166, the degree of opening of the expansion valve 16 can be regulated.

Although in the foregoing description of the electrically-driven expansion valve 16 the duty control scheme has been described wherein the plunger 164 is continuously reciprocated to continuously repeat opening and closing of the valve holes 163a and 163b, a linear control scheme may also be used wherein the degree of opening is regulated by continuously varying the amount of displacement of the plunger 164 by means, for example, of a servo-motor.

FIG. 11 is a flowchart whose steps are executed by the control circuit 22. These steps constitute a first embodiment of a control process according to the present invention. As an air conditioner actuating switch (not shown) is turned on, control begins at step 300. At step 301, preset data are read, such as, for example, PID control constants Kp and Td, integral time Tio for the steady operation, integral time Tis for start operation, duty ratio DTo, preceding deviation E-1, E-2, and sampling time 0. Counters I and N are set along with the desired (objective) degree of superheat SHO. At step 302, the electromagnetic clutch 11 is turned on to start the compressor 10. At step 303, the evaporator inlet refrigerant temperature $T_E$ and the evaporator outlet refrigerant temperature $T_R$ are measured. At step 304, the actual superheat SH is calculated from the difference $(T_R - T_3)$ between the outlet refrigerant temperature and the inlet refrigerant temperature of the evaporator 17. At step 305, the deviation En between the actual superheat SH and the objective superheat SHO is calculated. At step 306, the calculation: $Z = -En \times En-1$ is performed to obtain a change of the sign (plus and minus) between the preceding deviation En-1 and the current deviation En. That is, Z bears the minus sign only when the sign of the deviation En has changed from plus to minus or from minus to plus as it advanced from the preceding to the current, i.e. only when the large-small relationship between the actual superheat SH and the objective superheat SHO has reversed. At step 307, the calculation: $N = N + 1$ for the counter N is performed. At step 308, it is determined whether or not Z obtained in step 306 is smaller than 0. When Z is smaller than 0 (when Z has the minus sign), the control advances to step 317 where the calculation: $I = I + 1$ for the counter I is performed.

On the other hand, when Z is positive as the result of the calculation done in step 306, the judgment in step 308 is NO, thus, the control advances to step 309. When the count I (the number of changes of the sign of En) is smaller than three (3), the control advances to step 318 where the counter N is set to $N = 0$.

At step 310, the time "Time": Time$= N \times 0$ is calculated. At step 311, it is determined whether or not Time$=0$. Since the count N is 0 immediately after the start of the refrigeration system, the judgment in step 311 is YES, thus, the control advances to step 319 where the integral time Ti of the PID control is set to Tis which is a shorter time suitable for the start operation (see FIG. 4). Then, the control advances to step 314 where the degree of opening. DTn, of the expansion valve 16 is calculated in accordance with the equation of the PID control indicated in the flowchart under the condition of Ti=Tis. In next step 315, the control waits the interval of the sampling time $\theta$ ($\theta = 2$ seconds), and in next step 316, the parameters are updated; the control returns to step 303.

Then, as indicated in a flowchart of an interrupt routine shown in FIG. 12, the electrically-driven expansion valve 16 is normally driven in accordance with the degree of opening, DTn, calculated in step 314.

Figure 4:
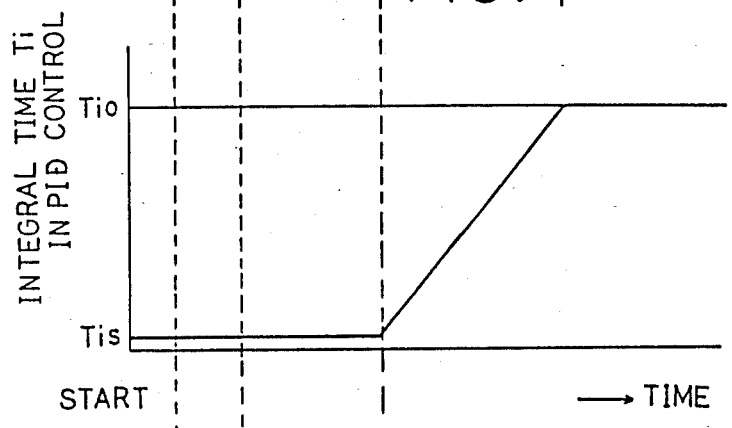
FIG. 4 is a graph, pertinent to the first embodiment, of an integral time Ti when the expansion valve is under the PID control as a function of time from the start of the refrigeration system shown in FIG. 1.

On the other hand, when the calculation result of the counter I becomes three (3) or more, the control advances from step 309 directly to step 310 where the time "Time" is calculated. Then, control advances from step 311 to step 312. Since "Time" is smaller than twenty (20) seconds in an initial period of operation, the control advances to step 313 where the integral time Ti is calculated in accordance with the equation indicated in the flowchart. That is, in proportion to an increase of "Time", Ti is gradually increased from Tis toward Tio as shown in FIG. 4.

Thereafter, when "Time" exceeds 20 seconds, the control advances from step 312 to step 320 where Ti is set to Ti=Tio.

The operation and effect of the expansion valve controlled in accordance with the first embodiment will now be described in greater detail. The degree of opening of the electrically-driven expansion valve 16 is intended to be controlled such that the actual degree of superheat SH of the refrigerant at the outlet of the evaporator 17 approaches the desired (objective) value SHO (for example, 5° C.). Since the actual degree of superheat SH can be represented by, for example, the temperature difference ($T_R - T_E$) between the inlet refrigerant temperature $T_E$ and the outlet refrigerant temperature $T_R$ of the evaporator 17, temperatures $T_E$ and $T_R$ are measured by respective first and second refrigerant temperature sensors 20 and 21. The actual superheat SH is obtained from the temperature difference ($T_R - T_3$) between them, and the PID control is performed by the control circuit 22 using the deviation En between the actual degree of superheat SH and the desired (objective) degree superheat SHO to control the degree of opening of the expansion valve 16. We define the degree of opening to be DTn (the duty ratio). DTn is obtained in accordance with the following equation using PID control.

$$DTn = DTn-1 + Kp\{(En - En-1) + 1/Ti \times En + Td \times (En - 2 \times En - 1 + En - 2)\}$$

where Kp is the proportional constant, Ti is the integral time, Td is the derivative time, and the subscripts, n, n−1, n−2, indicate the order of calculation.

At the time of controlling the degree of opening of the electrically-driven expansion valve 16 through the PID control, in order that the control system can control stably without "hunting", the optimum PID control constants (the proportional constant Kp, integral time Ti, derivative time Td) for steady operation of the refrigeration system must be selected such that Kp, Td are small, or Ti is large.

However, since the optional proportional constant Kp for steady operation is small from the view point of stability, it is impossible to cause the control of the degree of opening to follow a rapid change of the heat load condition and the like during the transient period, for example, at the start time, as a result, the degree of superheat SH cannot be controlled to an adequate value. In view of the above, the proportional gain Kp is made large or the integral time Ti is made small (i.e. 1/Ti is made large) at the start time to make it also possible to follow a heavy transient state of the refrigeration system to thereby adequately perform superheat SH control, whereby the cool-down performance effective in rapidly cooling the inside of the room can be enhanced.

Figure 2:
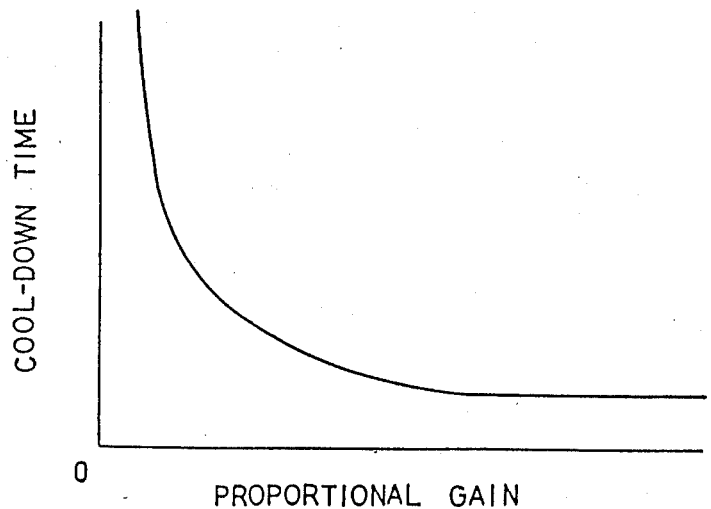
FIG. 2 is a graph of cool-down time necessary as a function of proportional gain for the system shown in FIG. 1.

According to experiments carried out by the inventor, if the proportional constant Kp is made large at the start time of the refrigeration system, the cool-down time (the time necessary to lower the room temperature down to a predetermined level) is decreased with an increase of Kp as shown in FIG. 2, whereby the cool-down performance can be improved.

Figure 3:
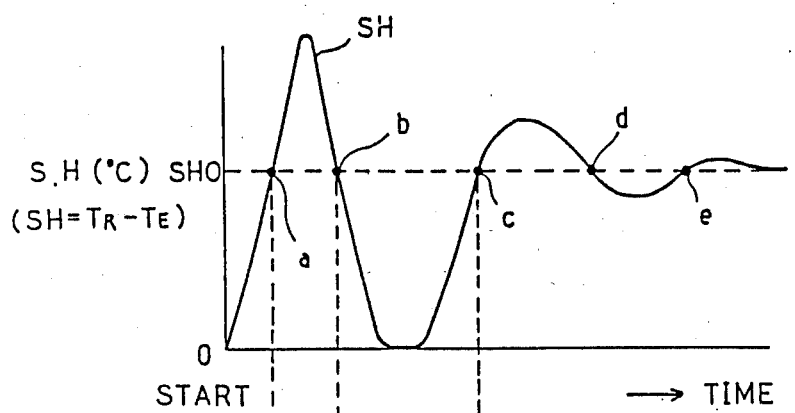
FIG. 3 is a graph, pertinent to a first embodiment of the invention, of the degree of refrigerant superheat as a function of time from the start of the refrigeration system shown in FIG. 1.

However, the actual degree of superheat SH immediately after the start of the refrigeration system fluctuates largely with respect to the objective superheat SHO as shown in FIG. 3. Where the deviation En=SH−SHO, an ideal control state is En=0. Immediately after the start, "SH=0" is maintained because the outlet and inlet refrigerant temperatures $T_R$ and $T_E$ of the evaporator are identical before the start. Since the working pressure of the refrigeration system is not yet increased immediately after the start, the pressure difference across the electrically-driven expansion valve 16 is small and the flow rate of the refrigerant is low, hence, the actual degree of superheat SH becomes large (in the interval of a−b in FIG. 3). Then, as the working pressure of the refrigeration system rises, the flow rate of the refrigerant abruptly increases. Thus, there occurs return (liquid back) of the liquid refrigerant to the compressor 10 momentarily, thereby resulting in "SH=0" (in the interval of b−c). Thereafter (after point c), through control of the degree of opening of the electrically-driven expansion valve 16, SH comes to coincide with SHO.

Each of the intersection points designated by a, b, c, d and e is the node where the sign, plus and minus, of the deviation En (En=SH−SHO) changes; as will be understood from the varying behavior of the actual superheat SH shown in FIG. 3, the refrigeration system is in the transient state up to the third intersection point c, the refrigeration system becomes stable little by little and assumes the steady state, thus, a steady-state stability is demanded for the control of the electrically-driven expansion valve 16. Accordingly, as shown in FIG. 4, the integral time Ti, for example, among the control constants of the PID control is held small from the start up to intersection point c to make it possible to respond to a rapid load variation, and is increased at a certain rate after intersection point c up to reaching the value Tio optimal for the steady state, whereby steady-state stability is realized.

Figure 5:
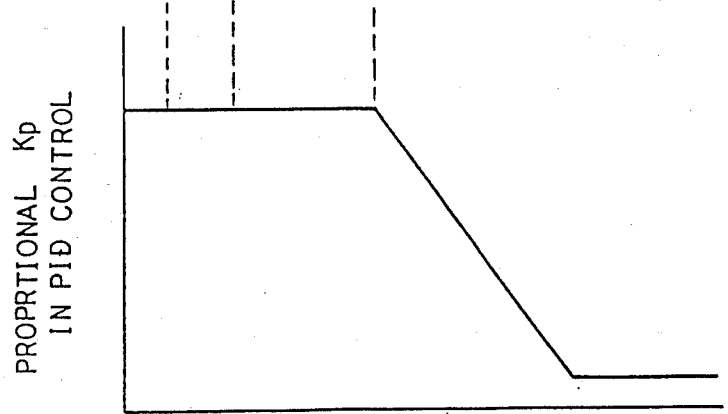
FIG. 5 is a graph, pertinent to the first embodiment, of the proportional gain of PID control when the expansion valve is under the PID control as a function of time from the start of the refrigeration system shown in FIG. 1.

Although in the above Ti is held small up to intersection point c, this may be held small up to the point d or e and increased after that point. Similarly, while keeping Ti constant, the proportional gain Kp maybe maintained large up to point c and decreased after that point down to a level optimal for the steady state, as shown in FIG. 5.

According to this embodiment as the initial value of duty ratio DTo is set to 100, the expansion value 16 is fully opened at the start of the refrigeration system, so that the time from the start of the refrigeration system to intersection point c tends to decrease with an increase of the heat load. By counting the number of intersection points a, b, c, ..., i.e. the number of times about what times the large-small relationship between the actual superheat SH and the objective superheat has reversed, and varying some control constants (Kp or Ti) of the PID control when the number thus counted reaches a set value (3, in the example of FIGS. 3 through 5), the PID control constants can be changed automatically at the correct time after start of the refrigeration system in compliance with the heat load of the evaporator 17 without using a special purpose sensor for detection of the heat load. Therefore, the degree of opening of the electrically-driven expansion valve can be controlled satisfactory in the transient period after the start of the refrigeration system with respect to both a high-load state and a low-load state, and the actual degree of superheat SH can be made to rapidly coincide with the objective superheat SHO.

Figure 13:
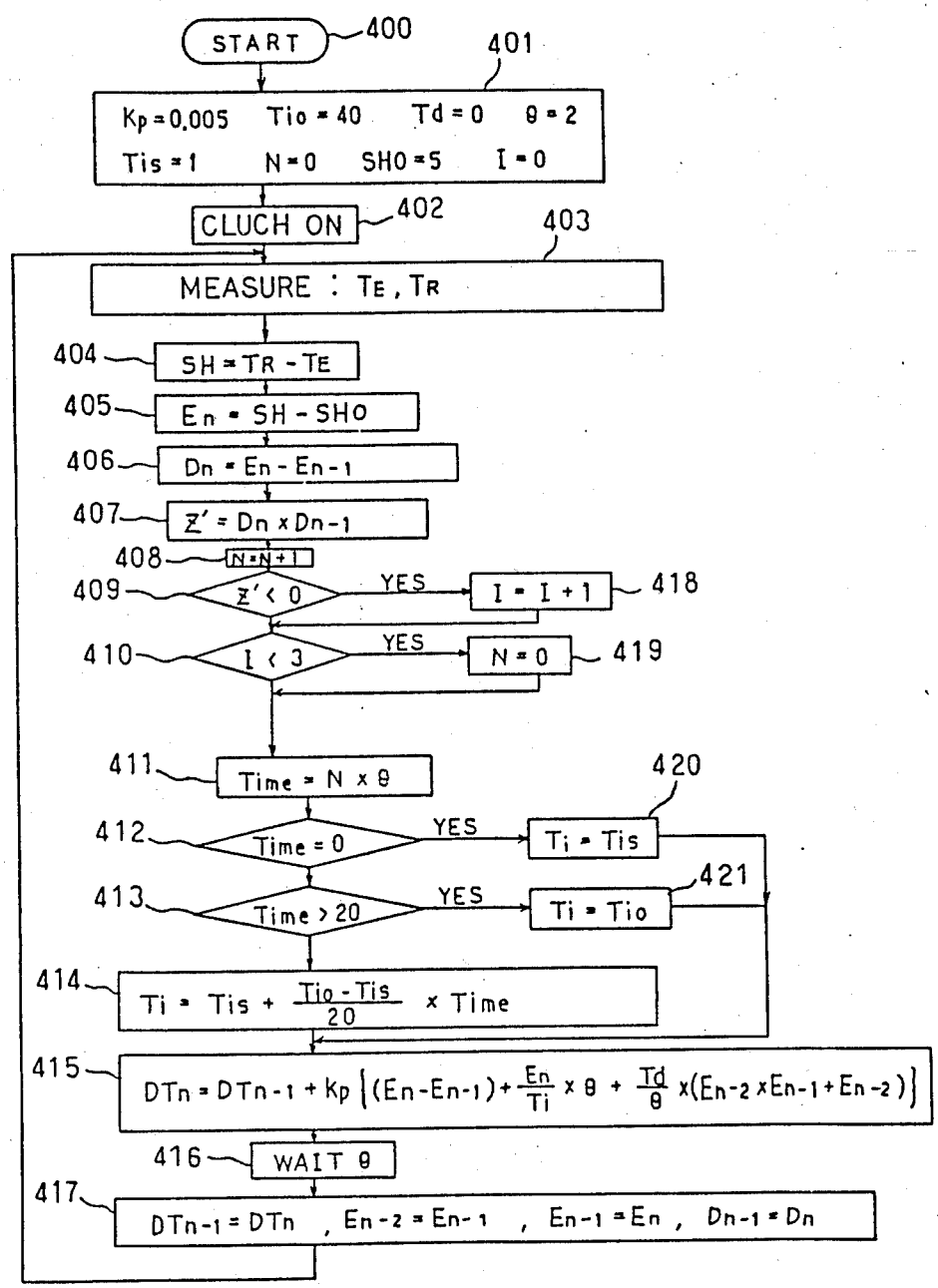
FIG. 13 is a flowchart showing in greater detail the control process of the second embodiment of the present invention.

A second embodiment of the present invention will now be described with respect to FIG. 13. FIG. 13 is a flowchart illustrating the control process of the second embodiment of the present invention. Steps 400 through 405 are identical to corresponding steps 300 through 305 to FIG. 11. In step 406, the rate of variation (the gradient), Dn, of the deviation En is calculated on the basis of the difference between the current deviation En and the preceding deviation En-1. In next step 407, the presence/absence of a change of the sign of the rate of variation, Dn, (a change of the sign of the differential coefficient of En), is detected in accordance with the equation: $Z' = Dn \times Dn\text{-}1$. That is, the sign of $Z'$ becomes minus only when a change of the sign is present (only when the actual degree of superheat SH passes over points a', b', ... in FIG. 7). Subsequent steps 408 through 417 are identical with steps 307 through 316 of FIG. 11, hence, no detailed description is given. In brief, in steps 408 through 417, as shown in FIG. 8, the integral time Ti for the PID control is set, when the count of the counter I is smaller than 3, so as to gradually increase from the value Tis in a course going from the start of the refrigeration system toward the steady state, and if "Time" becomes in excess of 20 second, "Ti=Tio" is adopted. The manner of driving the electrically-driven expansion valve 16 in accordance with the interruption flowchart shown in FIG. 12 is identical with the case of the first embodiment shown in FIG. 11.

The operation and effect of the electrically-driven expansion valve controlled in accordance with the second embodiment will now be described in greater detail. According to the first embodiment, as shown in FIGS. 3 through 5, the number of points a, b, c, where the large-small relationship between SH and SHO reverses is counted, and as the number thus counted reaches a predetermined number, the PID control constants Kp, Ti are varied. However, according to the second embodiment, as shown in FIG. 7, the number of points a', c', d' where the actual superheat SH alters its direction from the increasing direction to the decreasing direction and the number of points b', d' where it alters the direction from the decreasing direction to the increasing direction are counted, and as the sum number thus counted reaches a predetermined number (3, in the example of FIG. 7), the PID control constants are varied.

Figure 6:
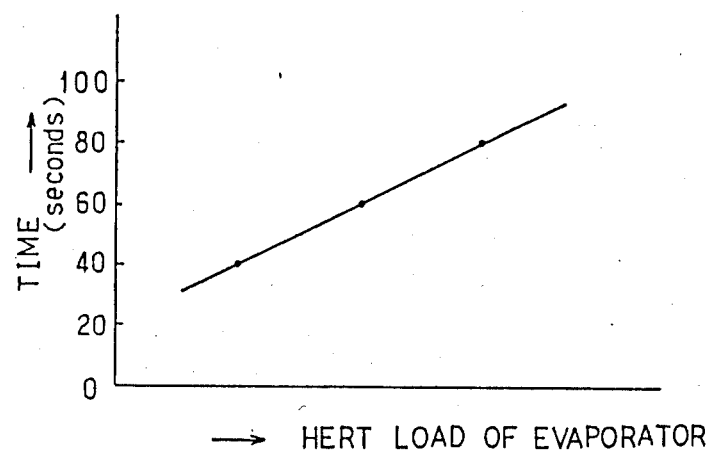
FIG. 6 is a graph pertinent to the first embodiment of the invention of time necessary for the refrigerant superheat to reach point c of FIG. 3 from the start of the refrigeration system as a function of heat load of the refrigeration system shown in FIG. 1.
Figure 8:
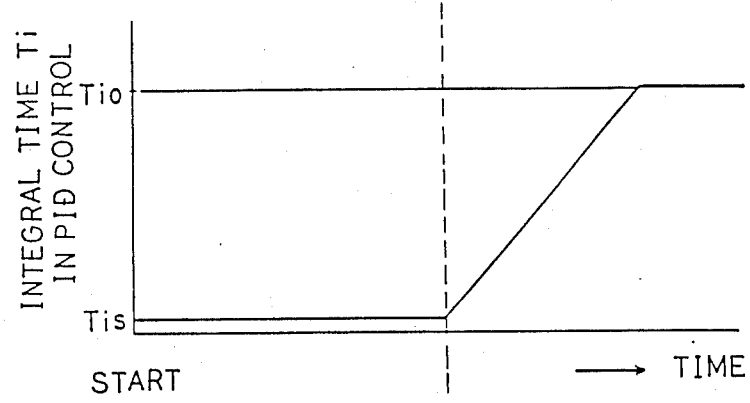
FIG. 8 is a graph pertinent to the second embodiment, of the integral time Ti when the expansion valve is under the PID control as a function of time from the start of the refrigeration system shown in FIG. 1.
Figure 9:
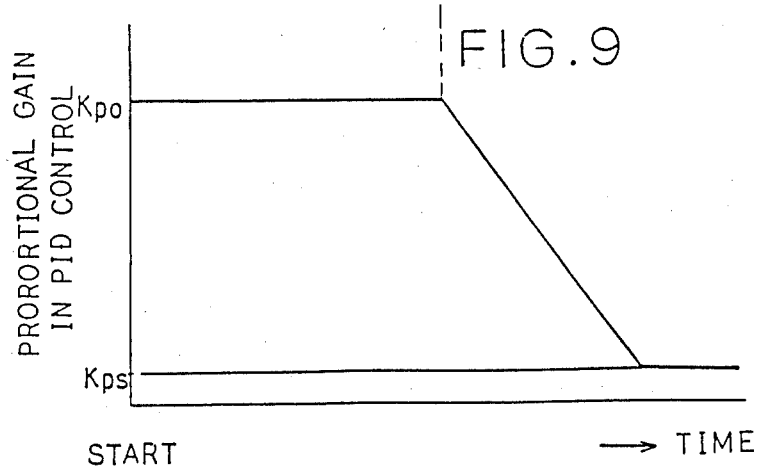
FIG. 9 is a graph pertinent to the second embodiment, of proportional gain when the expansion valve is under the PID control.

Specifically, the integral time Ti, for example, is increased gradually from the value Tis toward the value Tio after the moment corresponding to point c' as shown in FIG. 8. Of course, the proportional gain Kp may be decreased gradually from the value Kpo toward the value Kps after the moment corresponding to point c' as shown in FIG. 9 while keeping Ti constant. Since the time interval from the start of the refrigeration system up to the moment corresponding to point c' is proportional to the heat load of the evaporator as shown in FIG. 6, by varying the PID control constants at the moment corresponding to point c, similarly to the first embodiment, it is possible to switch, at an appropriate time in accordance with the heat load, between one control characteristic effective in enhancing the responsibility immediately after the start of the refrigeration system and another control characteristic effective in obtaining the stability of the steady state, thus, both the aforementioned control characteristics can be adopted compatibly.

Figure 7:
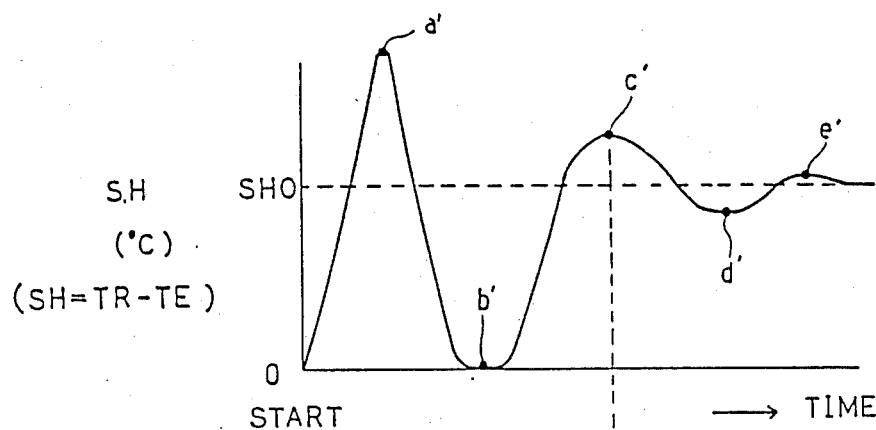
FIG. 7 is a graph pertinent to a second embodiment of the present invention, of the degree of refrigerant superheat as a function of time from the start of the refrigeration system shown in FIG. 1.

Although in the example of FIG. 7 both the upper group of transition points a', c', e' and the lower group of transition points b', d' of the actual degree of superheat SH are taken into account, the second embodiment can be practiced by taking into account either group only.

In both the first and second embodiments, Ti and Kp may be varied stepwise from Tis to Tio and from Kpo to Kps, respectively, without varying them gradually. In addition to the first and second refrigerant temperature sensors employed in the first and second embodiments, a third sensor can be utilized for detecting the heat load of the evaporator. In such a case, it is possible to control the timing of varying the PID control constants by the use of a signal from the third sensor.

Figure 14:
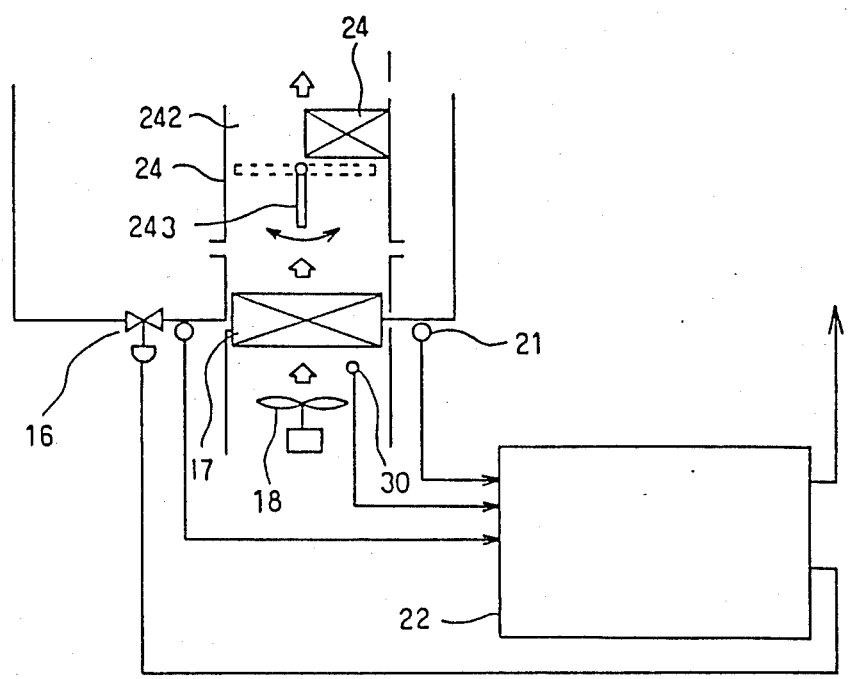
FIG. 14 is a block diagram of an alternative refrigeration system with an electric control system.

For example, in an alternative hardware arrangement shown in FIG. 14, a temperature sensor 30 is provided which detects the air temperature on the suction size of the evaporator. The signal output of the sensor 30 is applied to a control circuit which contains a program for varying the PID control constants in accordance with the suction-side air temperature thus detected. In operation, if the suction-side air temperature is high (heat load is large), the control constants are varied immediately after the start of the refrigeration system. On the contrary, if the suction-side air temperature is low (heat load is small) the control constants are maintained for a longer period from the start of the refrigeration system. As the heat load of the evaporator, these can be put into utilization such as the temperature of the outside air and the quantity of solar radiation, other than the suction-side air temperature described above.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A refrigeration apparatus comprising;
   (a) means for circulating a refrigerant;
   (b) an electrically-driven expansion valve for expanding and decompressing said refrigerant, said valve being adapted so that its degree of opening can be electrically controlled;
   (c) an evaporator for evaporating said refrigerant which is expanded and decompressed by said expansion valve;
   (d) target superheat setting means for setting a target value of a degree of superheat at an outlet of said evaporator;
   (e) actual superheat determination means for determining an actual degree of superheat at the outlet of said evaporator;
   (f) deviation determination means for determining a deviation between said actual degree of superheat and target degree of superheat;
   (g) opening degree control means responsive to said deviation, for electrically controlling the degree of opening of said expansion valve;
   (h) heat load determination means for determining the heat load to be cooled by said evaporator; and
   (i) control constant variation means for varying a control constant of said opening degree control means when an elapsed time after a start of circulation of the refrigerant reaches a reference time which is determined on the basis of said heat load.

2. A refrigeration apparatus according to claim 1, wherein said heat load determination means includes a temperature sensor for detecting a temperature of air to be cooled by said evaporator.

3. A refrigeration apparatus according to claim 1, wherein said refrigerant circulating means includes a compressor, driven by an engine mounted on a vehicle, for compressing said refrigerant.

4. A refrigeration apparatus according to claim 1, wherein said opening degree control means includes Proportional Integral Differential (PID) means for controlling the degree of opening of said expansion valve in accordance with a control function having proportional, integral, and derivative control components.

5. A refrigeration apparatus comprising;
 (a) means for circulating a refrigerant;
 (b) an electrically-driven expansion valve for expanding and decompressing said refrigerant, said valve being adapted such that its degree of opening can be electrically controlled;
 (c) an evaporator for evaporating said refrigerant which is expanded and decompressed by said expansion valve;
 (d) target superheat setting means for setting a target value of a degree of superheat at an outlet of said evaporator;
 (e) actual superheat determination means for determining an actual degree of superheat at the outlet of said evaporator;
 (f) deviation determination means for determining a deviation between said actual degree of superheat and target degree of superheat;
 (g) opening degree control means responsive to said deviation for electrically controlling the degree of opening said expansion valve;
 (h) circulation start detecting means for detecting a start of refrigeration by said circulating means and producing a start signal indicative thereof;
 (i) counting means for counting, in response to said start signal, a number of times when the actual degree of superheat which varies as the refrigerant is circulated becomes equal to the degree of target superheat;
 (j) means for generating a command signal when said counted number reaches a predetermined number; and
 (k) control constant variation means for varying, in response to said command signal, a control constant of said opening degree control means.

6. A refrigeration apparatus according to claim 5, wherein said control constant variation means varies said control constant as a function of time lapse after said counted number reaches the predetermined number.

7. A refrigeration apparatus according to claim 5, wherein said opening degree control means includes Proportional Integral Differential (FID) means for controlling the degree of opening of said expansion valve in accordance with a control function having proportional, integral, and derivative control components.

8. A refrigeration apparatus according to claim 7, wherein said control constant variation means varies an integration time of said PID means.

9. A refrigeration apparatus according to claim 7, wherein said control constant variation means varies a proportional gain of said PID means.

10. A refrigeration apparatus comprising:
 (a) means for circulating a refrigerant;
 (b) an electrically-driven expansion valve for expanding and decompressing said refrigerant, said valve being adapted so that its degree of opening can be electrically controlled;
 (c) an evaporator evaporating the refrigerant which is expanded and decompressed by said expansion valve;
 (d) target superheat setting means for setting a target value of a degree of superheat at an outlet of said evaporator;
 (e) actual superheat determination means for determining an actual degree of superheat at the outlet of said evaporator;
 (f) deviation determination means for determining a deviation between said actual degree of superheat and target degree of superheat;
 (g) opening degree control means, responsive to said deviation, for electrically controlling the degree of opening of said expansion valve;
 (h) circulation start detecting means for detecting start of refrigerant circulation by said circulating means and producing a start signal indicative thereof;
 (i) counting means for counting, in response to said start signal, a number of times when the direction (increasing/decreasing) of change of degree of superheat changes from one direction to the other;
 (j) means for generating a command signal when said counted number reaches a predetermined number; and
 (k) control constant variation means for varying, in response to said command signal, a control constant of said opening degree control means.

11. A refrigeration apparatus according to claim 10 wherein said control constant variation means varies said control constant as a function of time lapse after said counted number reaches the predetermined number.

12. A refrigeration apparatus according to claim 10 wherein said opening degree control means includes Proportional Integral Differential (PID) means for controlling the degree of opening of said expansion valve in accordance with a control function having proportional, integral, and derivative control components.

13. A refrigeration apparatus according to claim 12, wherein said control constant variation means varies an integration time of said PID means.

14. A refrigeration apparatus according to claim 12, wherein said control constant variation means varies a proportional gain of said PID means.

* * * * *